United States Patent [19]
Ford et al.

[11] Patent Number: 5,785,293
[45] Date of Patent: Jul. 28, 1998

[54] MACHINERY BASE

[75] Inventors: Jerry W. Ford, Plantersville; Delwyn N. Pounders; Kim D. Stanford, both of Saltillo, all of Miss.

[73] Assignee: Delta International Machinery Corp., Pittsburgh, Pa.

[21] Appl. No.: 576,595

[22] Filed: Dec. 21, 1995

[51] Int. Cl.⁶ .................................................. F16M 3/00
[52] U.S. Cl. .......................... 248/649; 248/670; 248/676; 280/35
[58] Field of Search ............................... 248/646, 647, 248/649, 650, 651, 656, 657, 670, 671, 672, 673, 676, 678, 129; 284/35, 79.11, 79.2, 79.5

[56] References Cited

U.S. PATENT DOCUMENTS

| | | |
|---|---|---|
| 2,354,906 | 8/1944 | Bailey et al. |
| 2,964,327 | 12/1960 | Mohr. |
| 3,534,974 | 10/1970 | Jerrard et al. |
| 4,270,718 | 6/1981 | Conner, Jr. ................... 248/649 X |
| 4,302,023 | 11/1981 | Kiesz. |
| 4,332,366 | 6/1982 | Descals Munt. |
| 4,620,608 | 11/1986 | Gilbreath. |
| 4,804,162 | 2/1989 | Rice ................................... 248/649 X |
| 5,299,817 | 4/1994 | Chang .................................. 280/35 |

FOREIGN PATENT DOCUMENTS 2455324  6/1975  Germany ........................ 280/35

OTHER PUBLICATIONS

Publication entitled "All New Delta Machinery Bases," Dated Jul., 1989, depicting Mobile Machinery Bases of Delta International Machinery Corp.

Pp. 4–9, 16 and 27 of *Innovative Shop Solutions Catalog*, copyright 1994, depicting HTC mobile machinery bases.

Instructional Material for Mobile Bases of Delta International Machinery Corp., Revised Apr. 10, 1992.

*Primary Examiner*—Ramon O. Ramirez
*Attorney, Agent, or Firm*—Kirkpatrick & Lockhart LLP

[57] ABSTRACT

A machinery base for supporting woodworking, metalworking and other machinery and which may be configured to a predetermined shape and dimensions by providing beam members of a predetermined length to connect individual corner brackets that define the corners of the machinery base.

9 Claims, 9 Drawing Sheets

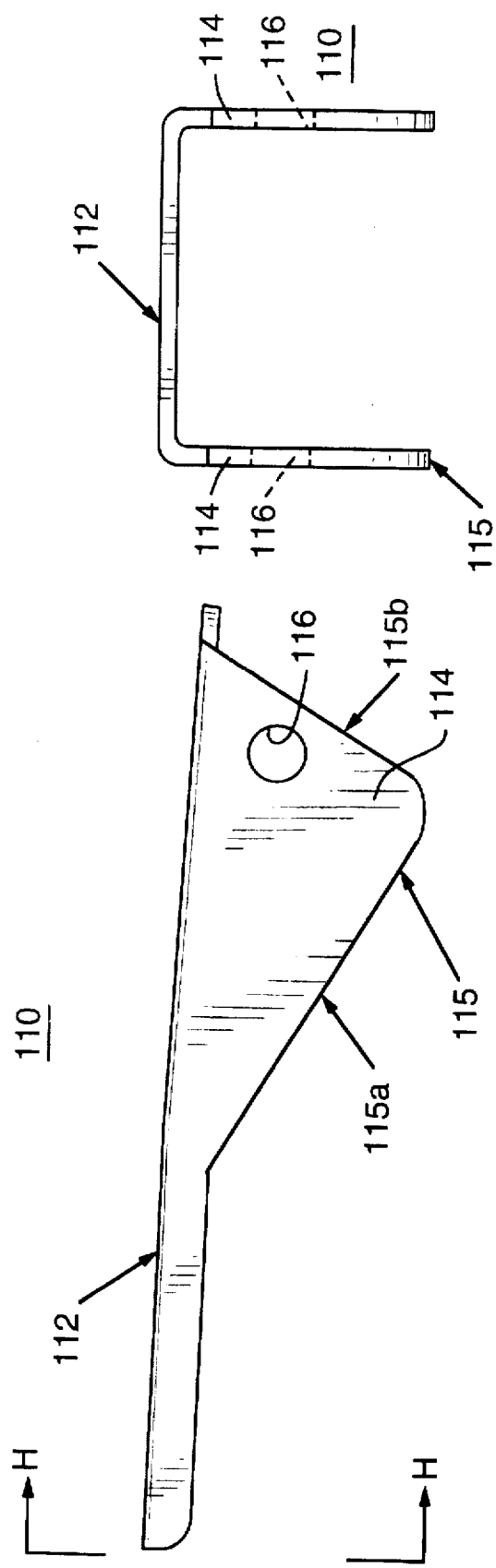

MACHINERY BASE

BACKGROUND OF THE INVENTION

1. Field of the Invention

The present invention relates to object bases or supports and, more particularly, relates to mobile machinery bases or supports for woodworking, metalworking and other machinery which may be configured to a predetermined size and shape to receive the base portion of the machinery to be supported.

2. Description of the Invention Background

Both industrial workshops as well as the basement workshop of the weekend tinkerer often become crowded with an assortment of woodworking and metalworking machinery. For example, amateur woodworkers who undertake projects in their free time may have several large stationary woodworking machines, for example, a drill press, table saw, band saw and jointer, lining the walls of a small workshop space. It is often difficult to work on large projects in such cramped work spaces and, therefore, an operator may need to shuffle the locations of machines or move a machine to the center of the workshop or to another room or garage so that it may be used. The ready mobility of the individual machines becomes very important.

Stationary woodworking and metalworking machines typically are quite heavy and difficult to move. Although it may be possible to move the machines by sliding them along the workshop floor, jarring the machines may adversely affect machine tolerances, loosen fastenings, or otherwise damage the machine. Moving very heavy machines or moving long distances, for example, from one part of a factory to another, may require use of a dolly. The machine will be out of service during the time it takes the operator or other personnel to obtain the dolly and complete the move.

Wheeled machinery bases are available to mobilize stationary woodworking and metalworking machines. For example, Delta International Machinery Corp., Pittsburgh, Pa. offers wheeled bases for a number of its freestanding woodworking and metalworking machines. However, the bases are not adjustable and are sized and shaped to fit specific machines; a wheeled machinery base purchased to fit the base of a particular machine could not be used with another machine having a differently sized and/or shaped base. Therefore, a very large number of different base configurations must be available to accommodate existing machinery. One manufacturer of wheeled machinery bases reports that since 1980 it has offered more than 1,000 differently sized and shaped wheeled machinery bases to fit the various machinery models sold under over 80 different brand names. Machinery bases for uncommon machinery models and for older machinery models, which often have base dimensions that are different from current models, must be special ordered or may be unavailable.

Because each machinery base that is currently available is manufactured to a specific size and shape, typically from tubular steel, production costs may be significant and it may be difficult to maintain sufficient inventory to accommodate demand. In addition, the introduction of a new machine having a novel base shape or size necessitates the manufacture of a new wheeled base, and the new base may be unavailable or may have to be special ordered if sales of the new machine have not reached commercially significant levels.

The need therefore exists for a mobile machinery base that may be sized and shaped to receive the base of a wide variety of stationary machines and which reduces the need to maintain a large inventory of bases specially manufactured to accommodate specific machine base shapes and dimensions. Accordingly, it is an object of the present invention to provide a mobile machinery base that may be easily configured by the manufacturer or consumer to a predetermined size and shape to accommodate the base portion of a large array of stationary woodworking, metalworking, or other machines.

SUMMARY OF THE INVENTION

To address the above objective, the present invention provides a machinery base or support for receiving the base of an object, such as a stationary woodworking or metalworking machine. The machinery base includes a plurality of corner brackets and a like number of oblong beam members of a predetermined length. Each corner bracket defines a corner of the machinery base and may include a support surface for accepting a portion of the machine to be supported. Each corner bracket is attached to an end of two of the beam members to provide a unitary structure of a predetermined size and shape.

The present machinery base is preferably configured as follows. Each corner bracket includes two cavities for receiving an end of a beam member. The corner brackets are attached to the beam members by fixedly disposing an end of each beam member in one beam receiving cavity. Each beam receiving cavity is preferably rectangular in cross-section and is defined by top, inner and outer walls. The inner and outer walls meet the top wall at a common edge, and the two inner walls of each corner bracket meet at a common edge and are disposed in substantially perpendicular planes. The support surface of a corner bracket may be disposed between and share a common edge with the two inner walls of the corner bracket.

The machinery base of the present invention may also include a wheeled mechanism for moving the machinery base along a floor surface. The mechanism is connected either to at least one of the corner brackets or at least one of the beam members. In a preferred configuration, the length of the top wall defining each beam receiving cavity is less than the length of the attached inner and outer walls so that said inner and outer walls extend beyond the beam receiving cavity to form inner and outer flanges coextensive with the inner and outer walls. The mechanism for moving the machinery base may include two or more wheel members, each wheel member rotatably attached between one set of inner and outer flanges on a corner bracket. To support the non-wheeled corner brackets above the floor, the present machinery base may also include foot members connected to one or more beam members that are adjacent the non-wheeled corner brackets.

The present machinery base further may include a wheeled mechanism for selectively lifting the foot members off of the floor surface so that the machinery base may be wheeled about on the wheel members and the wheeled mechanism. The wheeled mechanism preferably is in the form of a caster assembly attached to one of the beam members. The caster assembly constructed so that it is selectively positionable between an engaged configuration, wherein a caster wheel of the caster assembly is biased into contact with the floor to raise the support off of the foot members so that the support may be wheeled about on the caster wheel, and a disengaged configuration, wherein the caster wheel is biased away from the floor so that the foot members contact the floor and secure the machinery base against movement on the wheel members.

The present invention is also directed to an unassembled kit including those parts necessary to provide a machinery base as described above. The kit may include an appropriate number of beam members that may be pre-sized or sized by the manufacturer or consumer to provide a machinery base of a predetermined shape and dimensions. Alternately, the kit may exclude the beam members and the consumer would supply beam members in the form of, for example, wooden boards, in lengths necessary to assemble the kit into a machinery base of a predetermined size and shape.

Accordingly, the present invention provides an easily configurable machinery base that may be adapted by the manufacturer or the consumer to accommodate the base portion of a wide variety of woodworking, metalworking and other machines. The present invention largely does away with the necessity for producing a large number of machinery bases sized especially to accommodate the base dimensions of individual machines. Although the present discussion refers to the use of the present machinery base to support woodworking, metalworking, or other machinery, it will be understood that the present invention may be used to support any object with like effect.

These features and other advantages of the present invention will be apparent and more fully understood on consideration of the following detailed description in light of the following drawings.

BRIEF DESCRIPTION OF THE DRAWINGS

FIG. 18 is a side elevational view of the pedal of the machinery base of FIG. 1; and FIG. 19 is a front elevational view of the pedal of FIG. 18 in the direction of H—H in FIG. 18.

DETAILED DESCRIPTION OF THE PREFERRED EMBODIMENT

Figure 1:
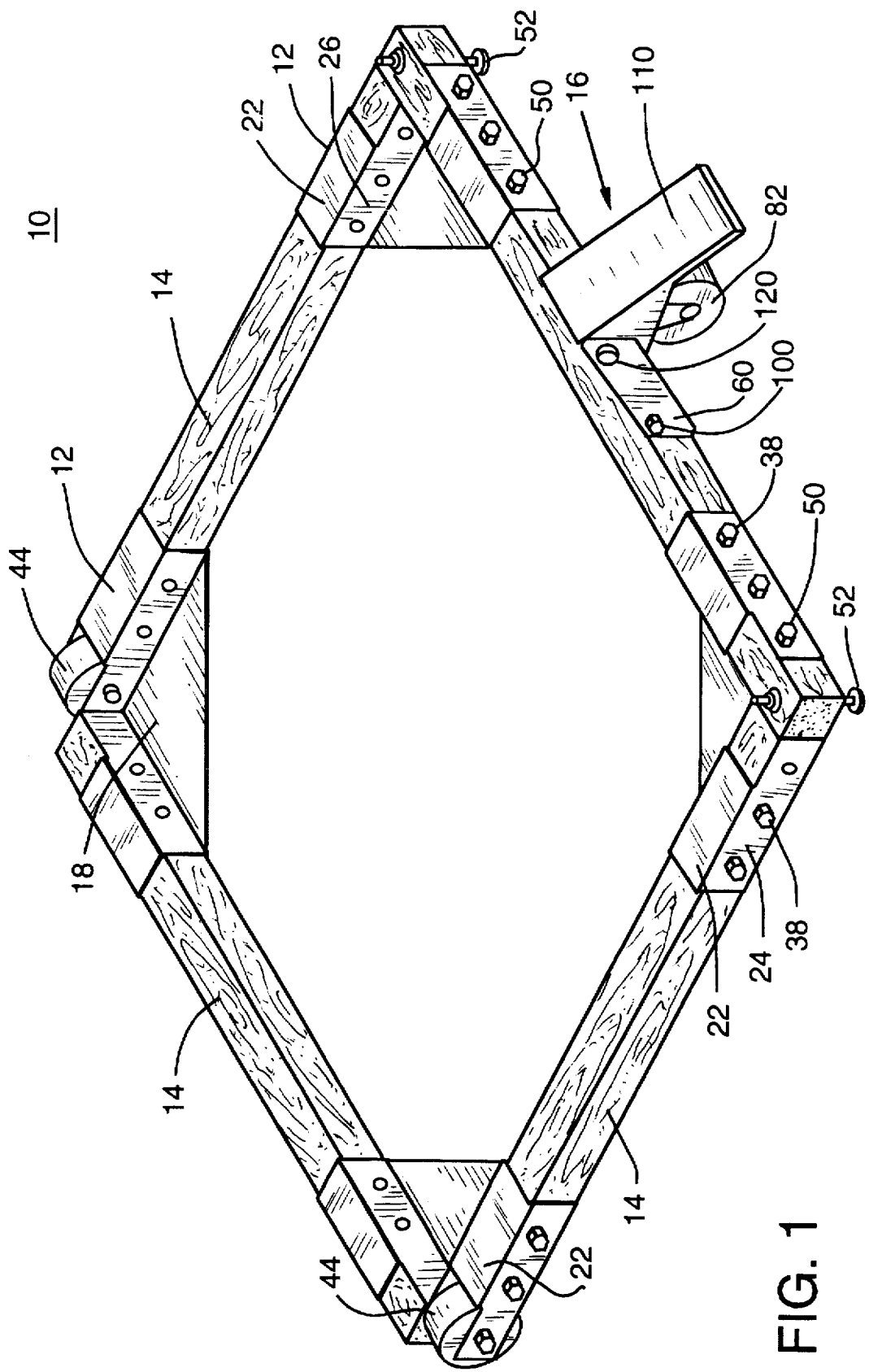
FIG. 1 is a perspective view of a machinery base of the present invention showing the corner brackets connected by beam members and the caster assembly in an engaged configuration.

Referring now to the drawings, which are for the purpose of illustrating the preferred embodiment of the present invention and not for the purpose of limiting the same, FIG. 1 depicts the preferred construction of the machinery base 10 of the present invention. The machinery base 10 generally includes four corner brackets 12 connected together by four oblong beam members 14.

Figure 2:
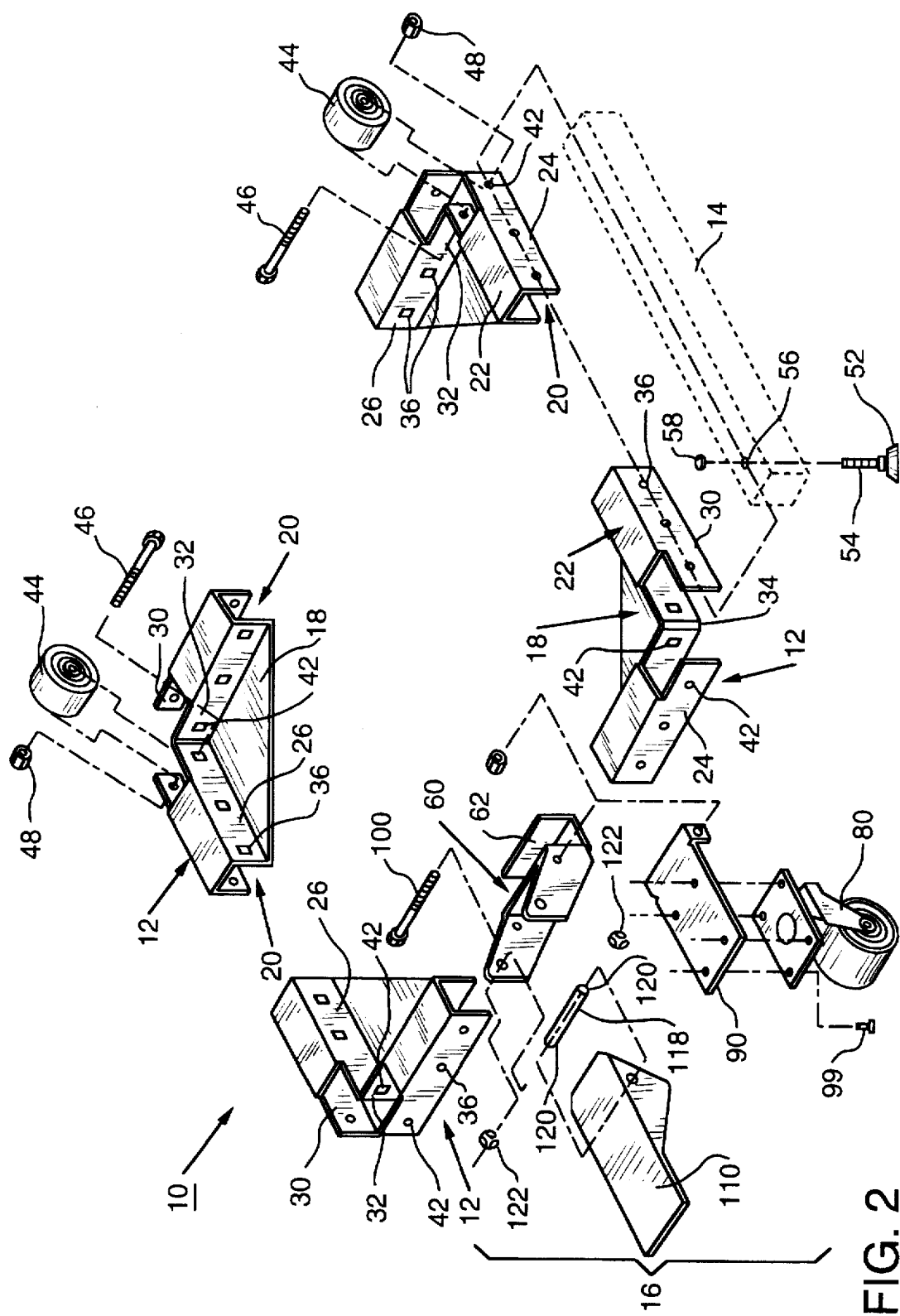
FIG. 2 is an assembly view of the machinery base of the present invention with one of the four beam members shown in dotted lines.

FIG. 2 is an assembly view of the machinery base 10 with only a single beam member 14 shown in dotted lines. The individual corner brackets 12 are constructed from a durable material, preferably steel, and include a support surface 18 for receiving a portion of the object to be supported. Each corner bracket 12 is configured to securely attach to two beam members 14 so as to form a strong, unitary structure that will support the weight of the object. Because the corner brackets 12 support the bulk of the weight of the object, the beam members 14 may be constructed of a material of lesser strength and, preferably, are constructed of wood.

The individual beam members 14 of the machinery base 10 are of lengths selected to provide the base 10 with dimensions compatible with the base of the object to be supported. For example, the machinery base 10 of FIG. 1 includes four corner brackets 12 configured to connect to two beam members 14 at right angles to one another, and each beam member 14 is of substantially the same length so as to provide a base 10 that is generally square and will accept an object having a base of a corresponding shape and size. Although the preferred embodiment of the machinery base 10 shown in FIG. 1 includes four corner brackets 12 and is generally square, it is to be understood that the machinery base of the present invention may include any number of corner brackets and may include beam members of any length so as to provide a base of any polygonal shape and size. For example, non-square rectangular bases may be provided by constructing the machinery base from two sets of beam members, each set having an equal length but being unequal to the length of the other set. To provide an equilateral triangular-shaped base, each corner bracket may be configured to connect to two beam members at 120° to one another and the three beam members would be of equal lengths. It will be apparent that irrespective of the number of corner brackets utilized, the number of beam members will be equal to the number of corner brackets.

The preferred construction of each corner bracket 12 is best shown in FIGS. 2 and 4–8. Each corner bracket may be constructed identically to reduce production costs and simplify assembly Each corner bracket 12 includes two beam receiving cavities 20, each cavity 20 for receiving an end of a beam member 14. Each beam receiving cavity 20 preferably is generally an inverted U-shape and is defined by top wall 22, outer wall 24 and inner wall 26.

So that the corner brackets 12 receive the beam members 14 at a desired angle, the longitudinal axes of the two beam receiving cavities 20 of each corner bracket 12 are preferably disposed at that same angle. In the preferred construction of the corner bracket 12 shown in the accompanying drawings, the longitudinal axes of the beam receiving cavities 20 are at substantially right angles to one another.

Figure 4:
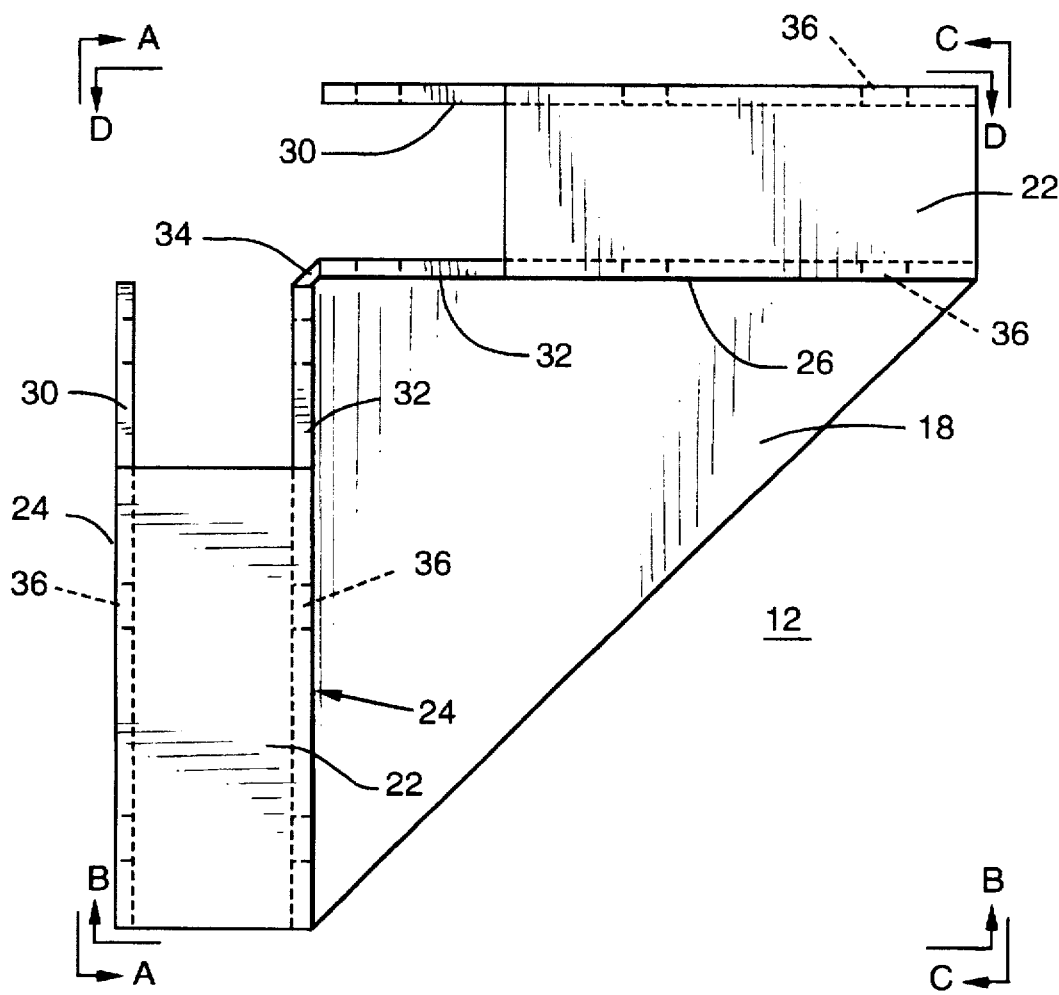
FIG. 4 is a top view of a corner bracket of the present invention.
Figure 5:
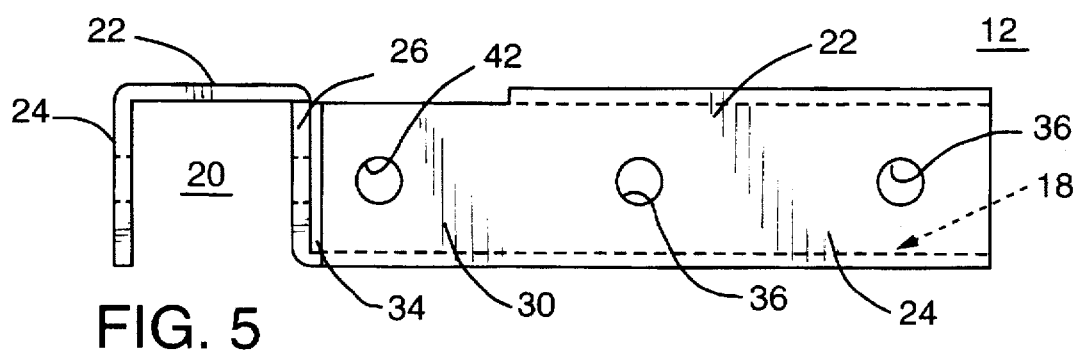
FIG. 5 is an elevational view of the corner bracket of FIG. 4 taken in the direction of A—A in FIG. 4.
Figure 6:
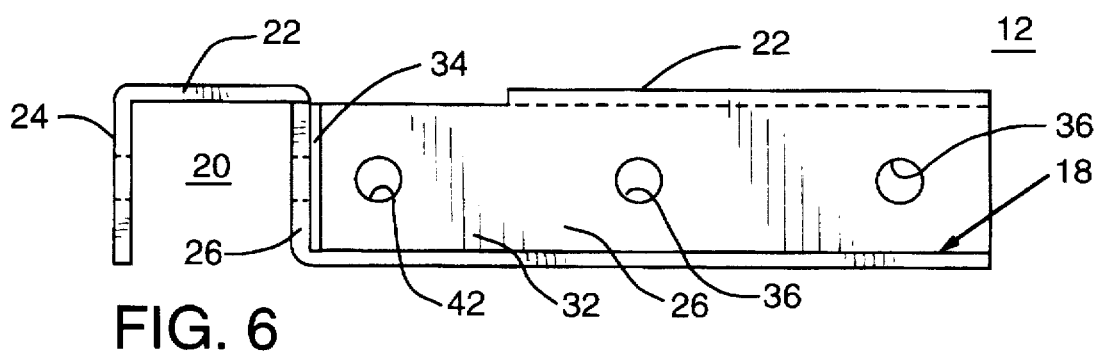
FIG. 6 is an elevational view of the corner bracket of FIG. 4 taken the direction of B—B in FIG. 4.
Figure 7:
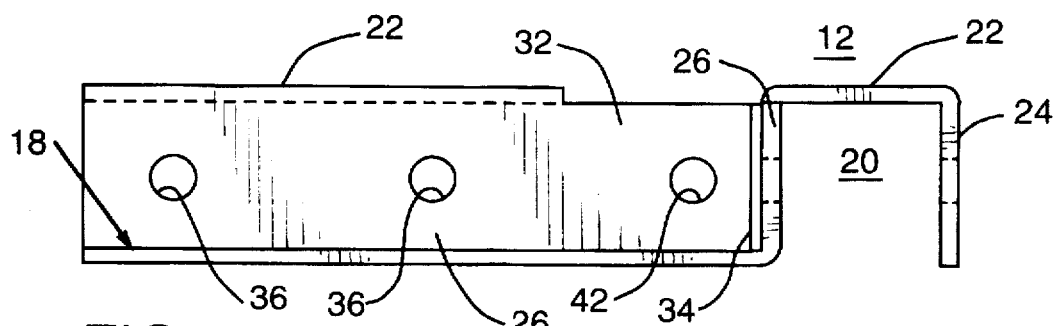
FIG. 7 is an elevational view of the corner bracket of FIG. 4 taken in the direction of C—C in FIG. 4.
Figure 8:
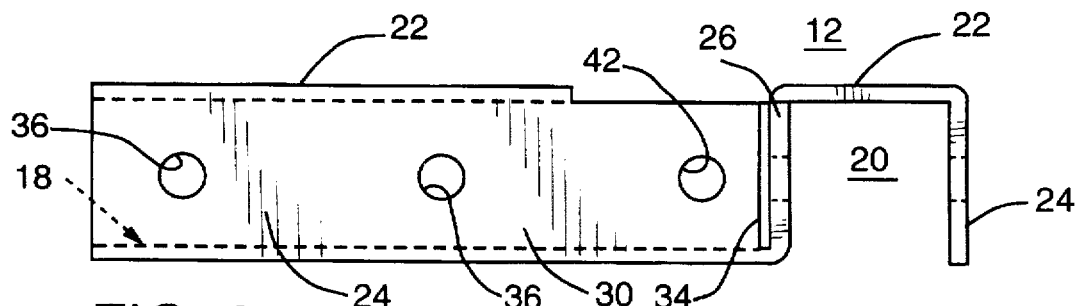
FIG. 8 is an elevational view of the corner bracket of FIG. 4 taken in he direction of D—D in FIG. 4.

As shown in FIGS. 1, 2 and 4, the outer wall 24 and inner wall 26 defining each beam receiving cavity 20 preferably extend one direction beyond top wall 22 to define corresponding outer flange portion 30 and inner flange portion 32. A bottom edge of the two inner walls 26 of each corner bracket 12 preferably is coextensive with the support surface 18, and the support surface 18 extends between the inner walls 26. The present preferred construction of each corner bracket 12 allows each to be constructed from a single flat piece of material cut from an identical pattern. The cut piece is then bent to form the two beam receiving cavities 20 and the support surface 18. Preferably, in fashioning the corner bracket 12, the ends of the inner flange portions 32 are brought into close proximity and may be joined, for example, by weld 34 to increase the strength of the corner bracket 12.

As best shown in FIG. 1 and indicated in FIG. 2, to connect the corner brackets 12 together, the opposed ends of each beam member 14 are fixedly disposed within the beam receiving cavities 20. To affix the beam members 14 within the beam receiving cavities 20, the outer and inner walls 24 and 26 defining the sides of the cavity 20 include one or more sets of aligned beam fastening bores 36. A fastener 38 is secured through each set of aligned bores 36 and through an aligned bore (not shown) in the beam member 14 disposed between the outer and inner walls 24 and 26. To securely affix the beam members 14 to the corner brackets 12, each beam member 14 preferably is sized to closely match the internal dimensions of the beam receiving cavities 20.

To mobilize the machinery base 10 of the present invention, wheel members 44 may be provided on one or more of the corner brackets 12. In the preferred embodiment of the invention shown in the drawings, two wheel members 44 are provided on adjacent corner brackets 12. Each corner bracket 12 preferably includes a set of aligned flange bores 42 through the outer and inner flange portions 30 and 32. The wheel members 44 are rotatably disposed between the outer and inner flange portions 30 and 32 on an axle, which may be a threaded bolt 46 secured through one set of aligned flange bores 42 by, for example, nut 48.

Figure 3:
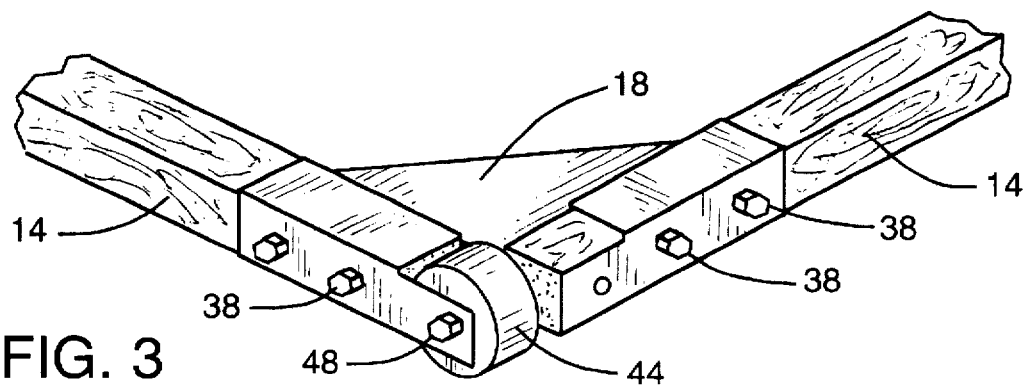
FIG. 3 is a perspective view of a corner bracket of the machinery base of FIG. 1 showing the attachment of a wheel member between inner and outer flange portions of the corner bracket.

As best shown in FIG. 3, each wheeled corner bracket 12 includes a single wheel member 44 and a set of free outer and inner flange members 30 and 32 not attached to a wheel member 44. The flange bores 42 are positioned so that clearance exists between a wheel member 44 disposed therebetween and the adjacent edge of top wall 22.

The machinery base 10 of the present invention may be assembled in the following manner. As shown in FIG. 3, one beam member 14 is to each wheeled corner bracket 12 so that the beam member 14 extends between the outer and inner flange regions 30 and 32 and is secured by a fastener (not shown) disposed between aligned flange bores 42 and through the interposed beam member 44. As such, the flange bores 42 may serve either to mount a wheel member 44 or to better secure a beam member 14 to the corner bracket 12. As best shown in FIG. 1, to increase the strength of the machinery base 10, two beam members 14 are attached to each non-wheeled corner bracket 12 so that the end regions of the beam members 14 abut. As shown in FIG. 1, in addition to utilizing fasteners 38 to secure the beam members 14 to the non-wheeled corner brackets 12, a fastener 50 may also be secured between the aligned flange members 30 and 32 and through the interposed beam members 14.

To support the non-wheeled corner brackets 12 above the floor, foot members 52 may be affixed to one or more beam members 14. As shown in FIGS. 1 and 2, the foot members 52 may include a threaded portion 54 which is secured through a bore 56 in the beam member 14 by nut 58. The foot members 52 may be of the type allowing the machinery base 10 to be adjustably leveled on the floor. By lifting the side of the machinery base 10 which includes the foot members 52, the base 10 will be supported entirely on wheel members 44 and my be rolled about.

The machinery base 10 of the present invention may further include a wheeled mechanism for selectively raising and lowering the side of the machinery base 10 which includes the foot members 52. The preferred design of such a mechanism is caster assembly 16, best shown in FIGS. 1 and 2, and which is connected to a single beam member 14 intermediate two corner brackets 12. As shown in FIG. 2, the caster assembly 16 includes wheel pivot support bracket 60, caster wheel 80, caster wheel plate 90, and pedal 110.

Figure 9:
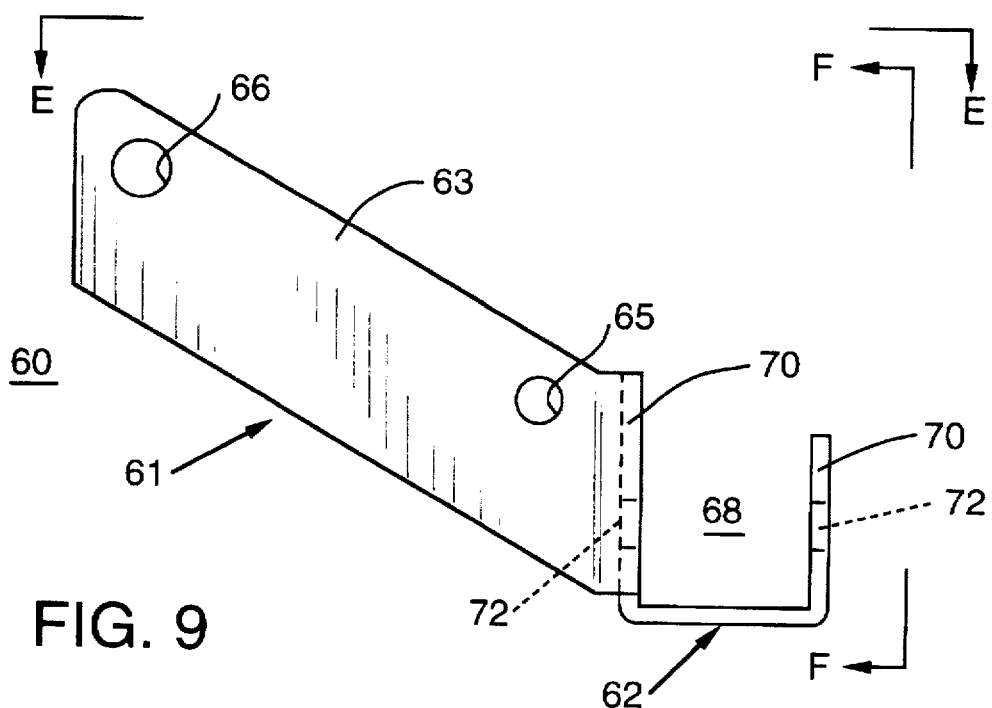
FIG. 9 is a side elevational view of the wheel pivot support bracket of the machinery base of FIG. 1.
Figure 10:
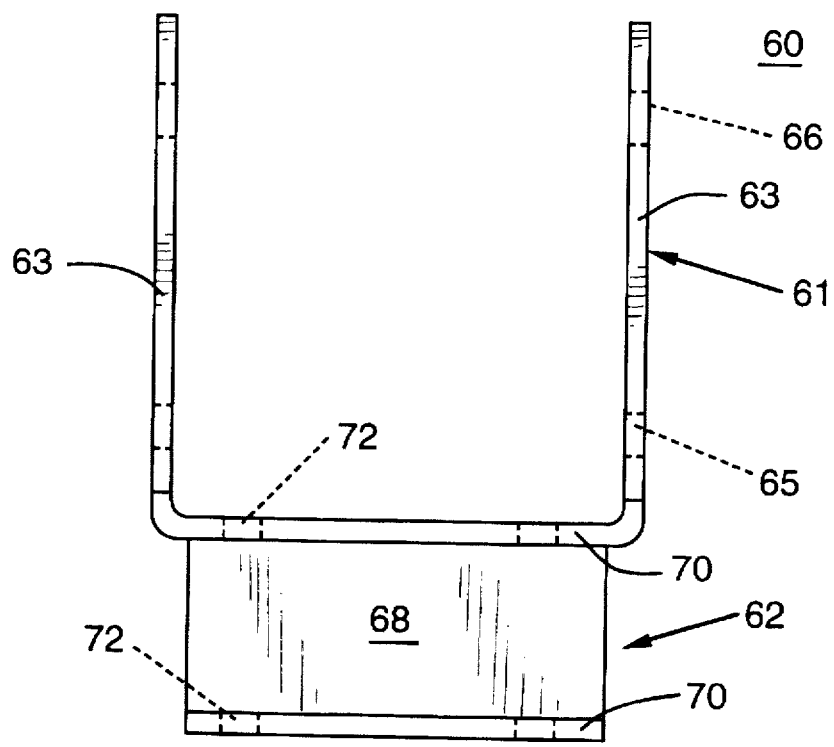
FIG. 10 is a top view of the wheel pivot support bracket of FIG. 9 taken in the direction of E—E in FIG. 9.
Figure 11:
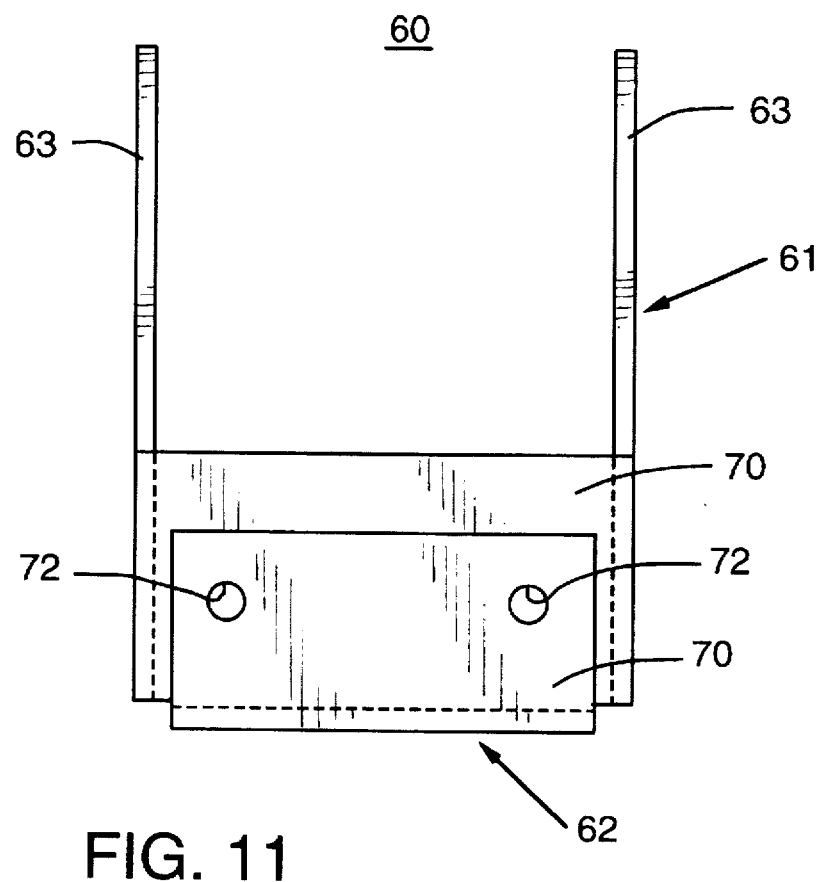
FIG. 11 is a front elevational view of the wheel pivot support bracket of FIG. 9 taken in the direction of F—F in FIG. 9.

Wheel pivot support bracket 60 is shown in isolation in FIGS. 9–11. FIGS. 10 and 11 are views in the direction of lines E—E and F—F, respectively, in FIG. 9. The wheel pivot support bracket 60 includes a first region, indicated generally as 61, and a second region, indicated generally as 62. The second region 62 defines a U-shaped attachment cavity 68, for connecting to a beam member 14. The first region 61 is composed of two generally parallel plate members 63 having first and second sets of aligned bores 65 and 66, respectively, therethrough. The plates 63 extend at an angle relative to the longitudinal axis of the attachment cavity 68, and the second set of aligned bores 66 is disposed at a higher elevation relative to the attachment cavity 68 than the second set of aligned bores 65. The parallel walls 70 defining the opposed sides of the attachment cavity 68 include two sets of aligned voids 72. The wheel pivot support bracket 60 is attached to the machinery base 10 by securing a beam member 14 within the attachment cavity 68, for example, by securing a fastener between each set of aligned voids 72 and through bores in the beam member 14.

Figure 14:
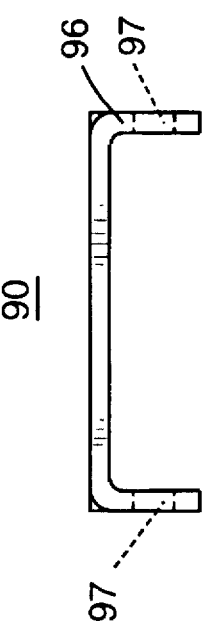
FIG. 14 is front elevational view of the caster wheel plate of FIG. 12 in the direction of G—G in FIG. 12.
Figure 12:
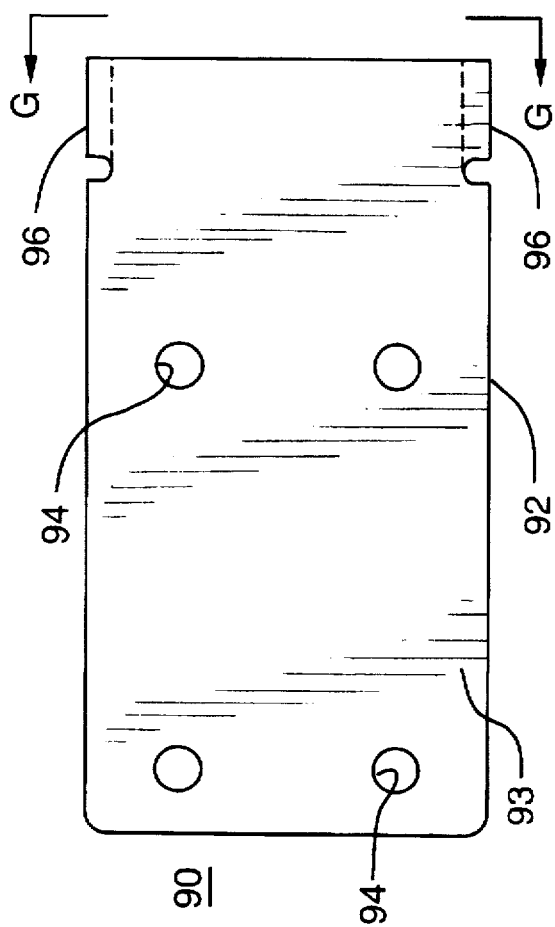
FIG. 12 is a top view of the caster wheel plate of the caster assembly of the machinery base of FIG. 1.
Figure 13:
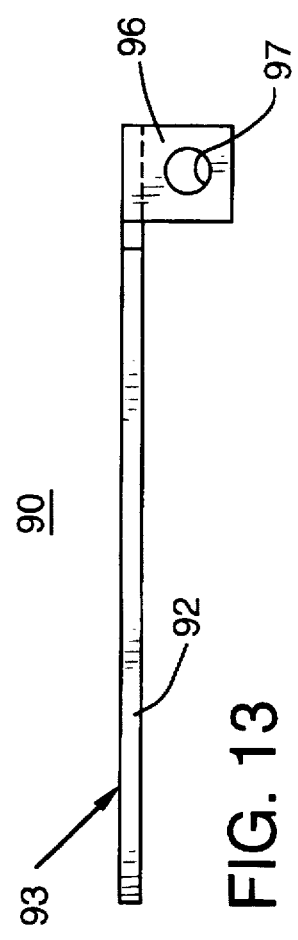
FIG. 13 is a side elevational view of the caster wheel plate of FIG. 12.
Figure 17:
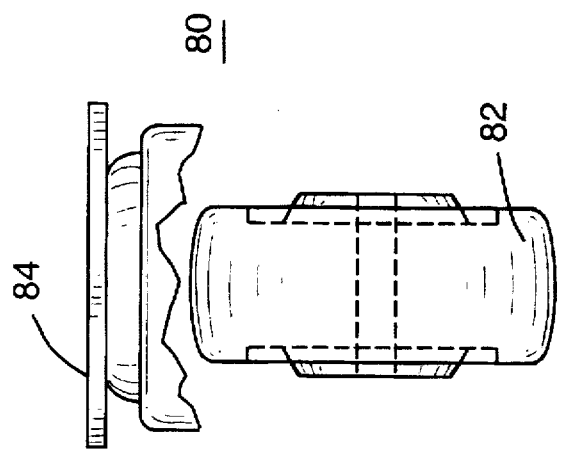
FIG. 17 is a front elevational view of the caster wheel and mounting plate of FIG. 15.
Figure 15:
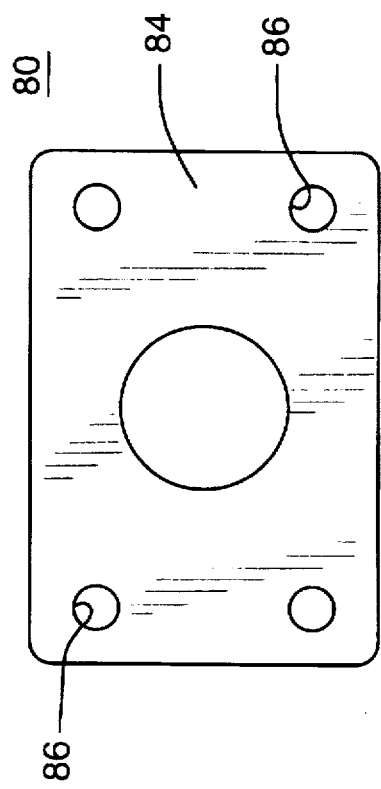
FIG. 15 is a top view of the caster wheel and mounting plate of the machinery base of FIG. 1.
Figure 16:
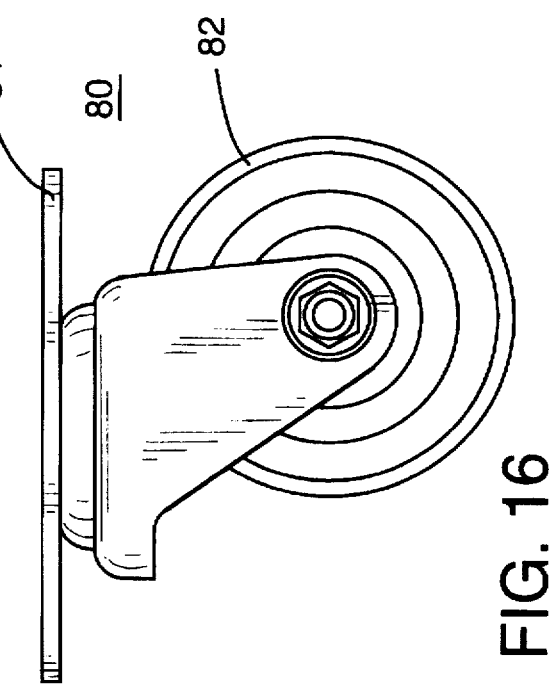
FIG. 16 is a side elevational view of the caster wheel and mounting plate of FIG. 15.

Caster wheel 80, shown in FIGS. 15–17, is of a conventional design and includes wheel 82 rotatably attached to mount 84 having four mounting bores 86 therethrough. Caster wheel plate 90, shown in FIGS. 12–14, includes a generally flat plate 92 having a top surface 93, four plate bores 94 therethrough, and two downturned pivot flanges 96, each including a pivot bore 97 therethrough. As shown in FIG. 2, caster wheel 80 is connected to caster wheel plate 90 by securing fasteners 99 through aligned bores 86 and plate bores 94. The caster wheel 80, in turn, is pivotally connected to the wheel pivot support bracket 60 by positioning caster wheel plate 90 between opposed plates 63 and securing fastener 100 through aligned pivot bores 97 and the second set of bores 65 in the first region 61 of the wheel pivot support bracket 60.

Pedal 110, shown in isolation in FIGS. 18–19, includes pedal surface 112 and opposed sides 114, each defining a rounded triangular-shaped region 115 having flat peripheral surfaces 115a and 115b. The opposed sides 114 also include aligned pedal bores 116. Pedal 110 is pivotally attached to the wheel pivot support bracket 60 by disposing the opposed sides 114 between plates 63 to align pedal bores 116 with the first set of aligned bores 66 in the first region 61 of the wheel pivot support bracket 60. Cylindrical pivot axle 118 is disposed through the aligned bores 116 and 66 so that the axle's end portions 120 extend outward from sides 114 of pedal 110. The axle is secured within the aligned bores 116 and 66 by affixing fasteners on end portions 120. The pedal 110 may thereby rotate about pivot axle 118 relative to the wheel pivot support bracket 60.

The components of the caster assembly 16 are configured so that the rounded triangular-shaped region 115 contacts the top surface 93 of caster wheel plate 90. By rotating the pedal 110, the caster assembly 60 may be disposed in either an engaged configuration or a disengaged configuration. In the engaged configuration, pedal 110 is rotated on pivot axle 118 toward the caster wheel plate 90, the triangular-shaped region 115 forces the caster wheel plate 90 to pivot toward the floor and the caster wheel is forced into contact with the floor to thereby lift foot members 52 off of the floor and allow the machinery base 10 to be wheeled about on caster wheel 80 and wheel members 44. If the pedal 110 is fully rotated toward the floor, flat surface 115a of each triangular-shaped region 115 will contact the top surface 93 of the caster wheel plate 90 and will lock the caster assembly 60 in the engaged configuration. By rotating the pedal 110 away from caster wheel plate 90 so that flat surface 115b contacts the caster wheel plate 90, the caster wheel 80 may move out of contact with the floor and foot members 52 will rest on the floor and stabilize the machinery base 10 against movement. Accordingly, by depressing or lifting pedal 110, an operator may easily select between the caster assembly's engaged and disengaged configurations to move the machinery base 10 from one position to another.

It is contemplated that the machinery base of the present invention may be assembled before sale or may be sold unassembled to a consumer as a kit including the necessary number of beam members and corner brackets. An operator or manufacturer may size the beam members included with the kit to provide a final machinery base having a predetermined shape and dimensions.

The present invention also contemplates a machinery base kit that includes as unassembled parts the necessary number of corner brackets and, optionally, the wheel members and caster assembly, but does not include the beam members. The consumer would provide the beam members in the form of, for example, oblong wooden members having a cross-section that will fit within the corner brackets' beam receiving cavities. The consumer may self-size the lengths of the individual beam members so that the final assembled machinery base is of a predetermined size and shape to accept the base of the machine to be supported.

As was the objective, the present invention provides a mobile machinery base that may be easily configured by the manufacturer or consumer to a predetermined size and shape. Accordingly, the present machinery base may be configured to accommodate the base portion of a large array of stationary woodworking, metalworking, or other machines.

While the present invention has been described in connection with the preferred embodiment of the various figures, it is to be understood that other similar embodiments may be used or modifications and additions may be made to the described embodiment by those skilled in the art, and that those changes are within the principle and scope of the invention as expressed in the appended claims.

What is claimed:

1. An object support for receiving an object, the object support comprising:

a plurality of oblong beam members;

a plurality of corner brackets, each said corner bracket comprising two beam receiving cavities, an end of a said beam member fixedly disposed within each said beam receiving cavity;

at least one rotatable wheel member connected to a said corner bracket;

at least one foot member connected to one of a said beam member and a said corner bracket, said foot member for partially supporting the object support; and a caster assembly disposed on one said beam member intermediate two said corner brackets, the caster assembly comprising:

a wheel pivot support bracket comprising a first region and a second region, said second region for connecting said wheel pivot support bracket to one said beam member;

a caster wheel plate having a caster wheel rotatably attached thereto, said caster wheel plate pivotally attached to said first region of said wheel pivot support bracket; and a pedal comprising a rounded surface, said pedal being rotatable attached to said first region of said wheel pivot support bracket, said rounded surface contacting said caster wheel plate to selectively position said caster assembly between an engaged configuration, wherein said caster wheel is biased into contact with a floor surface to raise the object support off of said at least one foot member, and a disengaged configuration, wherein the position of said caster wheel allows said at least one foot member to contact the floor surface to thereby inhibit movement of the object support.

2. The object support of claim 1 wherein at least one said corner bracket comprises a support surface for receiving a portion of the object.

3. The object support of claim 1 wherein each said beam receiving cavity is defined by at least a top wall and opposed inner and outer walls, and wherein for at least one said beam receiving cavity a length of its said opposed inner and outer walls is greater than a length of its said top wall so that said opposed inner and outer walls of said at least one beam receiving cavity define inner and outer flange portions, said at least one rotatable wheel member rotatably disposed between said inner and outer flange portions.

4. A kit for use with a plurality of beam members, the kit and the beam members to be assembled into an object support, the kit comprising:

a plurality of corner brackets, each said corner bracket defining a corner of the object support and comprising two beam receiving cavities, each said beam receiving cavity for fixedly receiving an end of one of the beam members; and a caster assembly constructed to be connected to one of the beam members, said caster assembly comprising:

a wheel pivot support bracket comprising a first region and a second region, said second region for connecting said wheel pivot support bracket to one of the beam members;

a caster wheel plate having a caster wheel rotatably attached thereto, said caster wheel plate attached to said first region of said wheel pivot support bracket so as to rotate relative to said caster wheel plate, and a pedal comprising a rounded surface, said pedal being rotatably attached to said first region of said wheel pivot support bracket, said rounded surface contacting said caster wheel plate to selectively position said caster assembly between an engaged configuration, wherein said caster wheel is biased into contact with a floor surface, and a disengaged configuration, wherein said caster wheel is not biased into contact with the floor surface.

5. The kit of claim 4 wherein each said corner bracket comprises a support surface for accepting a portion of the object.

6. The kit of claim 4 comprising four said corner brackets and wherein a longitudinal axis of the two said beam receiving cavities of each said corner bracket are at substantially 90 degrees relative to one another.

7. The kit of claim 4 wherein each said beam receiving cavity is generally rectangular in cross-section and is defined by at least a top wall and attached opposed inner and outer walls, the two said inner walls of each said corner bracket meeting at a common edge and being disposed in substantially perpendicular planes.

8. The kit of claim 7 further comprising a plurality of wheel members, each said corner bracket being constructed so that a said wheel member may be mounted thereon for rotational motion.

9. The kit of claim 8 wherein a length of each said opposed inner and outer walls of each said corner bracket is greater than a length of said attached top wall so that said inner and outer walls of each said beam receiving cavity define opposed inner and outer flange portions, the kit further comprising at least two wheel members, said inner and outer flange portions constructed so that a said wheel member may be mounted for rotational motion between said inner and outer flange portions.

\* \* \* \* \*